United States Patent [19]

Wilson et al.

[11] 3,956,142

[45] May 11, 1976

[54] NONCORRODING WATER BASE DRILLING FLUIDS AND ADDITIVE SYSTEM FOR MAKING

[75] Inventors: Doyne L. Wilson; Warren C. McMordie, Jr.; Albert H. D. Alexander, all of Houston, Tex.

[73] Assignee: Oil Base, Inc., Houston, Tex.

[22] Filed: Oct. 16, 1972

[21] Appl. No.: 297,770

Related U.S. Application Data

[63] Continuation of Ser. No. 186,452, Oct. 4, 1971, abandoned, which is a continuation-in-part of Ser. No. 772,821, Nov. 1, 1968, abandoned.

[52] U.S. Cl............................. 252/8.5 C; 252/8.5 P; 252/389 R
[51] Int. Cl.².......................................... C09K 7/00
[58] Field of Search ............... 252/8.5 C, 8.5 P, 389

[56] References Cited
UNITED STATES PATENTS

| | | | |
|---|---|---|---|
| 1,999,766 | 4/1935 | Lawton et al. | 252/8.5 |
| 2,605,221 | 7/1952 | Hoeppel | 252/8.5 |
| 2,773,031 | 12/1956 | Tailleur | 252/8.5 |
| 2,868,726 | 1/1959 | Brukner et al. | 252/8.5 |
| 3,307,625 | 3/1967 | Johnson et al. | 252/8.5 |
| 3,441,504 | 4/1969 | Browning | 252/8.5 |

FOREIGN PATENTS OR APPLICATIONS

| | | |
|---|---|---|
| 1,954,262 | 6/1970 | Germany |

*Primary Examiner*—Benjamin R. Padgett
*Assistant Examiner*—B. H. Hunt

[57] ABSTRACT

Water base drilling fluids having superior stability characteristics and having an improved noncorroding nature utilize an additive system comprising an alkali metal lignin, lignite, quebracho, and a water soluble chromium (VI) salt capable of introducing chromate ions into the alkaline water base mud system. An additive system having these four respective ingredients in a weight proportion of about 4:2:1:1 is admixed with a clay-water mixture to formulate the drilling fluid.

12 Claims, No Drawings a novel water base drilling fluid composition. It is a further object of this invention to provide a novel additive system which may be added to a clay-water mud system to provide a composition having the properties of viscosity, gel strength and plastering to function as an effective water base mud system.

NONCORRODING WATER BASE DRILLING FLUIDS AND ADDITIVE SYSTEM FOR MAKING

RELATED APPLICATIONS

This is a continuation of application Ser. No. 186,452, now abandoned filed Oct. 4, 1971 which, in turn, is a continuation-in-part of U.S. application Ser. No. 772,821, filed Nov. 1, 1968, now abandoned and entitled "Noncorroding Water Base Drilling Fluids and Additive System for Making Same."

BACKGROUND

The instant invention relates to novel drilling fluid compositions. More particularly, the instant invention relates to a novel water base drilling composition formulated with a unique additive system which results in a drilling mud having superior stability characteristics and improved noncorroding characteristics.

The use of a drilling fluid, commonly called a drilling mud, in drilling operations using the rotary drilling method is well known. The drilling fluid functions to lubricate and cool the drill bit so as to increase its useful life and also serves as a carrier for the cuttings made by the bit in drilling the borehole. The drilling fluid also supplies a hydrostatic head on the formation to counterbalance any pressures of liquids or gases which are encountered in the various strata through which the drill bit passes. Finally, the drilling fluid should function to create a plastering effect on the walls of the borehole to limit the flow of fluid from the borehole into the formation and thus leave the formation in as near to a natural state as is possible.

The drilling muds which are employed in a majority of drilling operations are of the water base type. The popularity of these muds results from the universal availability of water and their relatively lower cost when compared with oil base muds or invert emulsion type muds.

Conventionally, the water base muds comprise fresh or salt water, clay, weighting agents, and miscellaneous additives such as thinning agents, fluid loss agents, and the like. One of the more popular classes of thinning agents and additives for water base muds includes the metal lignosulfonates. These lignosulfonate compounds are derived from the spent sulfite liquor obtained in the sulfite process of wood pulping. Although these compounds demonstrate satisfactory thinning properties when used in the mud, they present serious problems because of their instability in the presence of elevated temperatures and pressures which are increasingly encountered in the deeper wells being currently drilled. At high temperatures, the lignosulfonate compounds tend to break down and lose their thinning ability. However, a side effect of the lignosulfonate breakdown appears to be the liberation of hydrogen sulfide or possibly other acidic and corrosive compounds which present problems of corrosion of the tools being used in the borehole and furthermore appear to cause hydrogen embrittlement of the steel tools and drill pipe employed in the borehole.

The use of the lignosulfonates has consequently been hampered not only by a deterioration in the drilling mud properties requiring constant retreatment of mud subjected to elevated temperatures, but furthermore has presented an appreciable problem with respect to corrosion and hydrogen embrittlement of the drilling tools employed with the mud.

In view of this history of experience with the lignosulfonates, it is apparent that there is a need for an additive system for a water base mud which accomplishes the thinning function while not resulting in the formation of by-products which have corrosive or other deleterious effects on the well tools used in the mud environment.

SUMMARY OF THE INVENTION

It is accordingly an object of this invention to provide a novel water base drilling fluid composition. It is a further object of this invention to provide a novel additive system which may be added to a clay-water mud system to provide a composition having the properties of viscosity, gel strength and plastering to function as an effective water base mud system.

It is still a further object of this invention to provide a water base mud system which has improved stability under conditions of use at elevated temperatures in a borehole.

It is among the further objects of this invention to provide a novel water base mud which under conditions of use does not deteriorate to form by-products which result in corrosion and/or hydrogen embrittlement of metal tools used in a mud environment.

It is among the further objects of this invention to provide an additive system which may be added to a clay-water formulation made with fresh water, salt water, or saturated salt water to provide an effective water base drilling fluid.

Other objects of this invention in providing improved water base drilling fluid compositions will become apparent upon consideration of the description of the invention set forth in the specification.

The instant invention provides novel water base drilling fluids comprising a water-clay mixture characteristic of such water base fluids, weighting material, and a novel additive system to function as a thinning agent for the fluid, provide the desirable rheological properties necessary for drilling fluid, and to provide the fluid with the necessary plastering properties. The novel additive system of this invention is likewise applicable to oil-in-water emulsion fluids which behave in virtually all respects like water base fluids, but which contain an emulsified oil phase which aids in lubricating the bit and enables holding the hole closer to gauge.

The additive system of the instant invention comprises a combination of four components, all of which are necessary to obtain the optimum properties in accordance with this invention. The four necessary components of the novel additive system of this invention are an alkali metal lignin, lignite, quebracho, and a heavy metal salt which is a chromium (VI) salt and will be further described below.

Although each of these ingredients of the instant novel additive system has been used on various occasions in drilling fluid compositions, it has been found that the specific combination of these four components when employed in accordance with the teachings herein provides the basis for a well drilling fluid composition which will maintain its rheological properties during use and which is a significant improvement over lignosulfonate based additive systems in providing a noncorrosive mud environment to well tools despite use at high temperatures. The use of the muds of this invention does not cause adverse effects on metallic drilling tools downhole which occur with lignosulfonate type muds and are postulated to result from hydrogen embrittlement of the tools in the mud environment.

The novel additive system of this invention is preferably formulated utilizing specific ratios of the four ingredients mentioned above. The utilizable ratios will be further delineated herein. However, in a specific embodiment, a preferred formulation is comprised of four parts by weight alkali lignin, two parts by weight lignite, one part by weight quebracho, and one part by weight of the chromium (VI) salt as will be further defined herein.

DESCRIPTION OF THE SPECIFIC EMBODIMENTS

The additive system of the instant invention is a dry, powderlike material which can be formed from the physical admixture of an alkali lignin, lignite, quebracho, and the chromium (VI) salt. The additive system can, alternatively constitute a complex reaction product of the four ingredients set forth above, which is prepared by a controlled reaction of the constituents as will be discussed hereinbelow.

In either case, whether the additive system of this invention is prereacted or is maintained as simply a physical admixture, the material is typically provided at the well site as a sacked powder which is added to the clay-water-mud mixture, with the desired amount of weighting material, to provide a fluid having the rheological character necessary in a drilling mud.

The predominant component of the additive system of this invention is an alkali lignin, derived from the pulping liquor of wood chips subjected to an alkaline pulping process.

Lignin itself is the major noncarbohydrate constituent of wood and woody plants. It functions as a natural plastic binder for the cellulose fibers and permeates the membranes of the cells and the spaces between the cells of the wood thereby strengthening them. Although many investigators have attempted to define lignin in terms of its precise chemical structure, there has been no success in proposing an adequate definition. It should be noted that lignin is not a single definable compound, but rather is a group or system of high molecular weight, amorphous materials that are chemically closely related. Furthermore, it should be noted that lignin, in its natural form in wood is primarily of academic interest only. Pure natural lignin has resisted all efforts at isolation in its completely natural and unchanged state. That is, no method has been yet devised for the isolation of lignin of wood in a form identical with that in which it exists in its natural state.

However, a great deal of work has been performed with lignin as it is obtained from the spent liquors of pulping operation. Two of the most widely used pulping processes are the acid or sulfite process, and the alkaline or "soda" process. The product of the former pulping operation is the lignosulfonate type compounds mentioned above with respect to drilling fluids. The alkali lignins used in the instant invention are products of the alkaline-type processes such as the "soda" process. More likely, however, the alkali liquors which are commercially available are products of the "sulfate" or "kraft" process for wood pulping. This is a more widely used improvement of the basic alkaline pulping operation which was first represented by the soda process.

The alkali lignins are obtained from the commercial black liquors from alkaline pulping of wood by acidification of the liquors. Suitable alkali lignins are derived from pine, hemlock bark, Douglas fir bark, redwood bark and the like. The discussion of various processes for isolation of lignin according to the alkaline pulping method may be found in the reference work THE CHEMISTRY OF LIGNIN, Erwin A. Pearl, Marcel Dekker, Inc., 1967 (pages 18 et seq.).

The alkali lignins typically contain alkali salts of long chain aliphatic acids as well as alkali salts of high molecular weight, phenolic acids having a molecular weight about 10,000. Most typically, the alkali lignins which are available are the sodium salts of these various acids and consequently such compounds are preferred for use herein, although the corresponding potassium salts could be employed. The alkali metal lignins are also identified by a low content of sulfur generally less than about 2 or 3 percent by weight.

Consequently herein when reference is made to "alkali lignins" or "alkali metal lignins" it shall be understood that reference is had to these well-known materials derived from alkaline pulping processes. The above discussion is not an attempt at precise chemical definition of these compounds inasmuch as they are extremely complex mixtures of acids and acid salts, the precise chemical structure of which is not known. The alkali metal lignins employed in this invention are typically soluble in water and in alkali, but are insoluble in acids. In acid mediums, an insoluble lignin precipitate is formed. As will be further discussed herein, suitable alkali metal lignins are available from a variety of sources in varying states of purity. It has been found in accordance with this invention that it is not necessary to use the highly purified forms of alkali metal lignin (sometimes called alkali metal lignate) and that it is acceptable to use crude alkali metal salts of lignin containing impurities introduced by the pulping process, typically small amounts of free alkali metal salts, such as alkali metal carbonates. Indeed the mother liquor from the pulping process may be used satisfactorily.

The alkali lignins are used in combination with lignite as the second component of the novel additive systems of this invention. Lignite is a low rank of coal between peat and subbituminous coal. The distinction between peat lignite, and coal is not sharp as the transition from one to another is gradual. Lignite contains a major proportion of humic acid, and consequently, it will be appreciated that humic acid can be substituted for lignite in the compositions of this invention. Furthermore, it will be recognized that inasmuch as water base muds normally contain caustic to raise the pH of the mud into the alkaline range, that the use of causticized lignite or sodium humate can be substituted for the use of lignite or humic acid as may be desired so long as the pH of the mud is maintained in the desired alkaline range, which normally is the vicinity of pH 10. Causticized lignite can simply be prepared by admixing lignite with sodium (or potassium) hydroxide to form a solution and digesting the solution at moderate temperatures e.g., up to about 150° F or so. When reference is made to "lignite" herein, it will be understood that causticized lignite, humic acid, or sodium humate could be substituted. As noted above, it may be necessary to adjust to the desired pH.

The novel additive systems of this invention also include as a third component a plant tannin of the type represented by quebracho extract. These plant tannins are composed of complex organic compounds. Their precise chemical formulas are not known, but it is postulated that these plant tannins contain predominant amounts of different hydroxybenzoic acids. The plant tannins upon hydrolysis yield complex organic acids.

The quebracho extract is preferred for use in this invention; however, it will be understood that plant tannins of analagous nature derived from other sources can also be employed, including chestnut extract and the like.

The final necessary component in the novel additive system of this invention is a water soluble chromium (VI) salt capable of releasing reducible chromate ion ($CrO_4^-$) in the basic aqueous medium which constitutes the drilling fluid. Accordingly, the water soluble chromates may be used, and since dichromate ion converts to chromate in alkaline media, the water soluble dichromate salts are also useful. Similarly, chromic acid or chromium trioxide (chromic acid anhydride) form chromate ion in basic solution and hence these materials may also be employed.

The chromates are known as oxidizing agents although they are only weakly oxidizing in basic solution. It was accordingly postulated that the oxidizing capacity of the anion was contributing to the efficacy of the mud system of this invention. Other oxidizing anions were tested in mud systems to determine if they would provide substitutes for the water soluble chromate ion releasing salts. It was found that other oxidizing agents did not perform satisfactorily. The chromate ion releasing salts appear to be unique in their ability to provide an effective water base mud system when employed in combination with the other constituents of the novel additive system of this invention.

The preferred salts which may be used include the water soluble alkali metal chromates and dichromates, preferably the chromates and dichromates of sodium or potassium. Also useful are ammonium chromate and ammonium dichromate. When these ammonium compounds are used to formulate a mud, a distinct odor of ammonia can be detected upon admixture of the additive system indicating that the ammonium ion has been replaced by sodium ion present in the mud since caustic is most customarily used to maintain the mud in the desired alkaline condition. Hence, the ultimate effect is largely the same with the ammonium salts as with sodium chromate or dichromate. Chromic acid or chromium trioxide can also be used although it will be recognized that additional sodium hydroxide might be needed to adjust the pH of the mud to the proper level when such materials are added. Addition of chromic acid or chromium trioxide also results in the in situ formation of sodium chromate in the alkaline mud system.

It appears that it is the weakly oxidizing chromate anion which is important to introduce into the mud in order to achieve the desired efficacy with the additive system of this invention. Thus, although the above compounds are preferred, other water soluble salts capable of introducing the chromate ion into solution in the water base system might be used. For example, calcium chromate and magnesium chromate, are both water soluble and might be used. However, it will be recognized by those skilled in the drilling mud arts that introduction of calcium or magnesium ion into a fresh water mud system might produce undesirable flocculation of the suspended clays. Hence, such salts would be avoided in fresh water systems though they would be employed in sea water mud systems without adverse effects since the flocculation problem does not appear to exist in these systems. Typically, the heavy metal chromates are water insoluble and hence are not useful. Since the chromate salt ionizes in the mud medium to release chromate ion, any soluble chromate or dichromate salt which introduces watere soluble chromate ions into the system might be employed so long as the metal ion does not adversely affect the system.

Chromic acid, chromium trioxide, and chromates and dichromates of sodium, potassium and ammonium are the most readily available sources of chromate ion and hence these are preferred. At times the chromates and dichromates occur predominantly in the hydrated form, e.g., sodium dichromate dihydrate, and such salts may also be used.

The novel additive systems of this invention are preferably formulated within rather narrow proportional limits of the above components. Desirably, the novel additive systems of this invention are formulated containing about 40 to 60 percent by weight of alkali metal lignin, about 20 to about 47 percent by weight lignite, and about 3 to about 15 percent by weight of quebracho or other tannin compound, and about 3 to 15 percent by weight of the water soluble chromium (VI) salt measured as the equivalent weight of sodium chromate. However, the amount of alkali metal lignin is usually equal to or in excess of the amount of lignite in the additive formulation. In these proportions, the four-component additive formulation of this invention has been found to give superior results to formulations using lignosulfonates or to formulations using alkali metal lignins in absence of one or more of the necessary components.

The amounts or proportions of the novel additive system of this invention to be incorporated in the drilling fluids are largely dependent upon such factors as the type of drilling fluid employed, the constituents present in the fluid other than the novel additive system, the types of formations encountered and the like. In general, the novel additive system of this invention may be employed to initially formulate the drilling fluid and further can be successfully employed in additional amounts to retreat the drilling fluid if extremely adverse conditions are encountered. In general, upon initial formulation, small amounts of the novel additive system of this invention are employed, typically from about 5 to about 15 pounds per barrel. However, substantially larger portions of the additive system may be employed as, for example, up to about 20 to 25 pounds per barrel.

Generally, about 8 pounds per barrel of the additive system is employed in formulating the drilling mud. Additional amounts of additive can be added to the mud to restore rheological properties during use if the mud encounters adverse downhole conditions. About one or two pounds of additive per barrel is generally a sufficient retreatment to restore mud properties.

The methods employed in formulating the drilling fluids of this invention are generally those customarily employed in the art for such operations. Initially, suitable clays and water may be admixed until the desired degree of hydration of the clay has taken place. The novel additive system, together with any other desired constituents, are then incorporated into the mixture and the resulting composition is stirred or otherwise agitated. Weighting material such as barium sulfate (barite) can be concurrently added and agitated or may be afterwards admixed with the fluid.

The novel additive systems of this invention may be employed in the various alkaline water base muds including fresh water muds or various types of salt water muds, i.e., in brackish-formation water muds, in sea water muds, or in saturated salt water muds.

The compositions of these clay-water muds are well known in the art and generally contain a hydratable clay such as bentonite, a small amount of caustic, typically an alkali metal hydroxide, to maintain the mud in an alkaline condition, and weighting agents. Bentonite is customarily present in fresh water muds in amounts ranging from about 10 to about 25 or 30 pounds per barrel. In salt water muds, the salt appears to have an effect on bentonite resulting in higher viscosities in high-bentonite content muds, and accordingly, bentonite content is normally maintained in the vicinity of about 10 pounds per barrel in salt water muds.

The clay-water muds of this invention may be weighted with a suitable weighting material such as iron oxide, barium sulfate, or the like as desired. It has been found that the novel additive system of this invention functions excellently to preserve the rheological and fluid loss properties of clay-water muds when weighted to as high as 20 pounds per gallon.

The novel additive systems of this invention may also be employed in oil-in-water emulsion mud systems; typically virtually any type of aqueous mud system can be converted to an oil-in-water emulsion mud through the simple expedient of adding the desired amount of oil in emulsifier. Such emulsion muds are not considered as special mud systems themselves, but rather are looked upon as a means for improving properties of water base muds and can be weighted and modified in a similar manner. Oil-in-water emulsion muds have generally been found by experience to possess several advantages over pure water base muds in that they enable holding the borehole closer to the drill bit gauge, serve to increase drilling rate, and result in less torque and drag on the drill pipe during the drilling operations. In a particular embodiment, the additives of this invention are advantageously employed in oil-in-water emulsion muds incorporating colloidal asphalt with the oil phase. Again, these muds are also basically water base drilling fluids.

Consequently, the novel additive systems of this invention can be used in such oil-in-water emulsion muds with equal effectiveness as in water-clay muds without an oil phase.

As mentioned above, the novel additive system of this invention can be a simple, physical admixture of the four necessary components set forth hereinabove. However, in a particular embodiment, the components of the additive system are prereacted to provide a reaction product additive the uniformity of which can be more easily controlled.

Typically, the interreaction of the components of the novel additive system of this invention can be effected by dissolving the components in water and heating the solution to a temperature below boiling, e.g., about 150° F to about 200° F. The additive reaction product is recovered by evaporating the water from the solution and drying the resulting solid material to obtain the powder-like additive suitable for sacking.

The novel additive systems of this invention may be used together with other additives which are customarily used with clay-water-mud systems. For example, polymers of acrylonitrile, as well as polyacrylates and polymethacrylates, and the sodium salts thereof can be used as organic fluid loss agents with the novel additive systems of this invention. Other additives are well known in the art and may also be employed.

The properties which characterize a usable and practical drilling fluid comprise: (a) initial gel strength; (b) viscosity; (c) 10-minute gel strength; and (d) fluid loss, which relates to the ability of the fluid to seal off a formation by building up a filter cake of mud on the wall, thus preventing the loss of fluid, in this case, water, from the mud to the formation. The latter consideration of fluid loss is most important inasmuch as if the producing formation contains a hydratable clay or another type of strata material which is swelled by water, it will be appreciated that escape of water to the formation can easily result in blockage of the formation at the borehole itself, thus greatly reducing the efficiency at which the formation can be produced.

It is important that the drilling mud, in the case of a temporary stoppage of drilling, should gel sufficiently to prevent the settling of suspended cuttings to the bottom of the borehole. Similarly, the mud should become fluid when agitation and drilling is resumed. The gel strength of the mud also serves to retain any weighting material which is added to the mud in a suspended state preventing the settling of this material as well.

It is common knowledge that one or more of these various stated properties of drilling mud may become adversely affected while drilling due to contamination of the mud by cement or by salt. Salt contamination may occur when drilling through rock salt or when the mud comes in contact with salt water in the formations penetrated. Contamination by calcium salts may occur when drilling through gypsum or the like which contamination can cause flocculation of the bentonite clay in the material. Cement contamination will occur whenever it is necessary to drill out a cement plug after a sealing operation. These various forms of contamination generally cause the viscosity, the gel strength, and the amount of water loss from the drilling mud to increase, sometimes to such an extent as to render the mud unusable.

The efficacy of a drilling fluid is consequently evaluted by established tests to measure viscosity, gel strength and fluid loss. In testing muds using the novel additive system of this invention contamination as would be encountered under drilling conditions has been introduced into the mud. Tests demonstrate the superiority of the additive system of this invention in all types of mud at high temperatures and pressures and in presence of salt and other contaminants.

It will be understood by those skilled in the art that the additive system of this invention can be employed in a wide variety of water base muds the formulations of which are well known in the art. Thus various hydratable clays may be used in addition to or in place of bentonite; any number of recognized weighting agents can be employed; and fluid loss additives including solid materials such as walnut shells and the like or chemical fluid loss agents as the mentioned polyacrylates can be introduced into the fluids of this invention without departing from this invention.

The following Examples are illustrative:

EXAMPLES 1 THROUGH 30c

To illustrate the essential nature of each of the components of the novel additive systems of this invention, a number of drilling muds were formulated and provided with additives in varying amounts. All samples prepared in all the following examples were formulated on a simulated barrel basis, and consequently proportions are designated on a pounds per barrel basis.

The base fluid of each formulation prepared and tested in Examples 1 through 30c included a 6 percent Wyoming bentonite slurry containing 21 pounds per barrel of bentonite in fresh water. To this slurry was added ten pounds per barrel of drill solids, ½ pound per barrel of caustic (sodium hydroxide), and sufficient barite to weight the muds to the density in pounds per gallon (ppg) indicated after each sample. There was then added 10 percent by volume of an oil phase containing colloidal asphalt suspended in diesel oil. Each of examples 1 through 30c also incorporate ½ pound per barrel of a fluid loss agent, specifically the sodium salt of polyacrylic acid. The ingredients were admixed with different additives to form each sample. Mixing was accomplished in a Waring blender for ten minutes at low speed.

In the following examples the designation 4:2:2:1 or any similar designation involving such a proportional designation of four figures is meant to indicate the ratio of the four components of the additive system of this invention in amounts by weight measured as pounds per barrel. Thus the designation "4:2:1:1:" designates four pounds per barrel alkali lignin, two pounds per barrel lignite, one pound per barrel quebracho extract, and one pound per barrel of sodium chromate. If a zero appears in any of the proportions below it indicates that that particular component was omitted from that sample for purposes of testing and demonstrating the necessity of all four components in the additive systems of this invention.

Each sample was formulated and then tested at 100° F. on a Fann Meter (Model 35) to obtain an apparent viscosity (Va) and a plastic viscosity (Vp) as well as a yield point (YP). Measurements were also taken of the 10 second-10 minute gel strength which is measured on a Fann Meter in units of pounds force per hundred square feet. In essence this latter measurement measures the initial gel strength of the fluid ten seconds after agitation and the gel strength after ten minutes of standing. The gel strength ideally should remain about the same.

To test for temperature stability each sample was also hot-rolled by placing the sample in a cylinder and rolling the cylinder in an oven at a designated temperature for a certain amount of time. The temperature and time involved in these hot-rolling tests varied with the examples below. In Examples 1–30a, hot-rolling was at 250° F for 72 hours for the initial samples and at 250° F for 17 hours for those samples indicated to be retreated. Examples 30b and 30c were hot-rolled at 325° C for 72 hours. The Fann measurements taken both before and after hot-roll show the effect of elevated temperature on the fluid. Similarly fluid loss measurements taken in a high temperature - high pressure filter press by subjecting the fluid to a given pressure and temperature for thirty minutes and measuring the fluid through the press further indicate the stability of the fluid. Measurement of pH was likewise taken both before and after the hot-roll treatment.

Most significant differences between the various samples tested can be found in the properties after the hot-roll treatment. It is at this time that the additives of the instant invention demonstrate their superior ability to stabilize the drilling fluid. Desirably in a drilling fluid the apparent viscosity measurement should be less than about thirty-five, the plastic viscosity measurement less than about thirty, with a yield point of about fifteen or less. The 10 second-10 minute gel strength is desirably about 2–2'. Fluid loss is desirably maintained as low as possible although a fluid loss less than about 5.5 cc. is acceptable.

The results of testing a number of samples having varying proportions of alkali lignin, lignite, quebracho, and sodium chromate are set forth below in Examples 1 through 30c. Example 30a shows results obtained when a drilling mud as above was treated with eight pounds per barrel of a reaction product of the four components of the additive system of this invention. The reaction product employed was prepared by admixing five parts by weight of an alkali metal lignin, 2.5 parts by weight of lignite, 1.25 parts by weight quebracho extract, and 1.25 parts by weight sodium chromate. These four ingredients were dissolved in water with one-half part by weight sodium hydroxide to aid dissolution. The solution was heated to about 200° F. and the water was permitted to evaporate. After the sample was almost dry, it was placed in an oven maintained at 180° F. and dried for about 12 hours. The yield obtained was 96 percent on a weight basis.

It may be seen that the reaction product of the ingredients works equally well as does the physical admixture of the ingredients to stabilize the oil-in-water mud tested.

The additive systems having proportions down to about 3 percent of each quebracho and the chromium (VI) salt [Ex. 30b] adequately stabilized the mud samples. However, absence of one ingredient produced less desirable results.

These tests demonstrate that a satisfactory mud additive system may be formulated with about 40 to about 60 percent alkali metal lignin, 20 to about 47 percent lignite and about 3 to 15 percent of quebracho and the chromate salt. However, the better results are obtained when the latter components, i.e., quebracho and the chromate salt, are present in amounts of 6 percent by weight based on the additive system weight.

Results are set forth in Table 1.

TABLE 1

| Example | Additive Formulation in lbs/bbl and Mud Condition | Fann Prop. at 100° F. | | | | | | | | Fluid Loss in cc. | | pH | |
|---|---|---|---|---|---|---|---|---|---|---|---|---|---|
| | | Before Hot Roll | | | | After Hot Roll at 250° F for 72 hrs. | | | | Before Hot Roll | After Hot Roll | Before Hot Roll | After Hot Roll |
| | | Va | Vp | YP | 10"–10' | Va | Vp | YP | 10"–10' | | | | |
| 1 | 8:4:0:0 weighted to 10 ppg. | 24 | 18 | 12 | 2–3 | 36 | 26 | 20 | 3–20 | 4.2 | 4.0 | 9.7 | 8.1 |
| 2 | Retreat Ex.1 with 1 lb/bbl 4:2:1.5:5 | 26 | 22 | 8 | 3–4 | 36 | 28 | 16 | 2–5 | 3.6 | 3.7 | | |
| 3 | 4:2:1.5:.5 weighted to 10 ppg. | 21 | 17 | 8 | 2–3 | 26 | 23 | 6 | 1–1 | 4.9 | 6.3 | 11.6 | 9.7 |
| 4 | Retreat Ex.3 with 1lb/bbl 4:2:1.5:5 | 29.5 | 24 | 11 | 2–2 | 31 | 26 | 10 | 2–2 | 5.0 | 4.3 | | |
| 5 | 4:2:2:0 weighted to 10 ppg. | 25 | 20 | 10 | 2–4 | 43.5 | 28 | 31 | 4–23 | 4.4 | 3.9 | 10.5 | 8.8 |
| 6 | Retreated Ex.5 with 1 lb/bbl 4:2:2:0 plus ½ lb/bbl | 30 | 23 | 14 | 2–10 | 29.5 | 23 | 13 | 2–2 | 3.7 | 3.8 | | |

TABLE 1-continued

| Example | Additive Formulation in lbs/bbl and Mud Condition | Fann Prop. at 100° F. Before Hot Roll | | | | Fann Prop. at 100° F. After Hot Roll at 250° F for 72 hrs. | | | | Fluid Loss in cc. Before Hot Roll | Fluid Loss in cc. After Hot Roll | pH Before Hot Roll | pH After Hot Roll |
|---|---|---|---|---|---|---|---|---|---|---|---|---|---|
| | | Va | Vp | YP | 10"–10' | Va | Vp | YP | 10"–10' | | | | |
| 7 | fluid loss agent 4:2:0:2 weighted to 10 ppg. | 20.5 | 19 | 3 | 2–3 | 68 | 57 | 22 | 3–3 | 5.2 | 7.2 | 11.5 | 9.4 |
| 8 | Retreat Ex.7 with 1 lb/bbl 4:2:0:2 | 30 | 24 | 12 | 2–3 | 37.5 | 31 | 13 | 3–3 | 5.7 | 6.6 | | |
| 9 | 4:2:1:1 weighted to 10 ppg. | 23 | 19 | 8 | 2–3 | 30 | 25 | 10 | 2–2 | 4.8 | 4.9 | 10.5 | 9.0 |
| 10 | Retreat Ex.9 with 1 lb/bbl 4:2:1:1 | 26 | 22 | 8 | 2–2 | 28 | 23 | 10 | 2–2 | 4.7 | 4.6 | | |
| 11 | COntaminate Ex.9 with 10 lb/bbl cement; 3 lb/bbl CaCl₂; 2 lb/bbl NaCl and 10% by vol. water | 33 | 23 | 20 | 7–26 | 40 | 28 | 24 | 4–28 | 5.8 | 10.0 | | |
| 12 | Retreat Ex. 11 with 1 lb/bbl 4:2:1:1 | 24 | 18 | 12 | 2–4 | 21.5 | 18 | 7 | 2–2 | 6.2 | 7.2 | | |
| 13 | 4:2:1:1 weighted to 10.7 ppg. | 28 | 23 | 10 | 2–4 | 44.5 | 36 | 17 | 2–3 | 4.0 | 4.5 | 10.3 | 9.0 |
| 14 | Retreat Ex.13 with 1 lb/bbl 4:2:1:1 | 31 | 26 | 10 | 2–2 | 28 | 23 | 10 | 2–2 | 4.2 | 4.0 | | |
| 15 | Contaminate Ex.13 as in Ex.11 | 43 | 33 | 20 | 4–11 | 58 | 43 | 30 | 7–32 | 4.9 | 7.0 | | |
| 16 | Retreat Ex.15 with 1 lb/bbl 4:2:1:1 | 30 | 23 | 14 | 2–5 | 31.5 | 24 | 15 | 2–5 | 5.3 | 6.4 | | 11.0 |
| 17 | 4:2:5:1.5 weighted to 10 ppg. | 20 | 19 | 2 | 1–2 | 31 | 24 | 10 | 1–1 | 5.3 | 5.3 | 11.0 | 9.0 |
| 18 | Retreat Ex.17 with 1 lb/bbl of 4:2:.5:1.5 | 23 | 19 | 8 | 2–3 | 25 | 21 | 8 | 2–2 | 4.1 | 4.8 | | |
| 19 | 4:2:.5:.5 weighted to 10 ppg. | 21.5 | 18 | 7 | 2–2 | 32 | 26 | 12 | 2–2 | 5.0 | 4.7 | 10.3 | 9.2 |
| 20 | Retreat Ex.17 with 1 lb/bbl of 4:2:.5:.5 | 26 | 22 | 8 | 2–2 | 24 | 20 | 8 | 2–2 | 4.0 | 4.4 | | |
| 21 | Ex. 19 contaminated as Ex.11 above | 28 | 22 | 12 | 3–12 | 54 | 39 | 30 | 7–22 | 4.8 | 9.8 | | |
| 22 | Retreat Ex.21 with 1 lb/bbl 4:2:.5:.5 | 23 | 18 | 10 | 2–4 | 27 | 20 | 14 | 2–4 | 6.4 | 6.6 | | |
| 23 | 4:2:1.5:1.5 weighted to 10 ppg. | 22 | 18 | 8 | 2–2 | 31.5 | 28 | 7 | 2–2 | 4.4 | 4.2 | 10.2 | 9.0 |
| 24 | Retreat Ex.23 with 1 lb/bbl 4:2:1.5:1.5 | 25 | 21 | 8 | 2–2 | 24 | 20 | 8 | 2–2 | 3.8 | 3.8 | | |
| 25 | Contaminate Ex.23 as in Ex.11 above | 30.5 | 22 | 17 | 7–20 | 47 | 33 | 28 | 7–36 | 5.9 | 10.0 | | |
| 26 | Retreat Ex.25 with 1 lb/bbl 4:2:1.2:1.5 | 24.5 | 20 | 9 | 2–5 | 26 | 20 | 12 | 2–5 | 6.8 | 7.9 | | 11/5 |
| 27 | 4:2:2:2 weighted to 10 ppg. | 23 | 18 | 10 | 2–3 | 37 | 30 | 14 | 2–2 | 4.0 | 4.5 | 10.3 | 9.0 |
| 28 | Retreat Ex.27 with 1 lb/bbl 4:2:2:2 | 27 | 22 | 10 | 2–2 | 27 | 22 | 10 | 2–2 | 4.2 | 4.0 | | |
| 29 | Contaminate Ex.27 as in Ex. above | 53 | 32 | 42 | 30–51 | 37 | 26 | 22 | 5–32 | 6.0 | 8.9 | | |
| 30 | Retreat Ex.29 with 1 lb/bbl 4:2:2:2 | 25 | 20 | 10 | 2–8 | 26 | 19 | 14 | 2–8 | 4.0 | 7.0 | | 11.2 |
| 30a | Reaction Product 4:2:1:1 | 22.5 | 20 | 5 | 2–3 | 34 | 31 | 6 | 2–2 | 3.8 | 4.1 | 11.3 | 9.6 |
| 30b.2 | 3.75 | 3.75-:.25:-.25 to 10 ppg. | 14.5 | 12 | 5 | 2–3 | 21.0 | 18 | 6 | 1–2 | 6.3 | 5.8 | 11.0 |
| 30c | 3.5:3.5:.5:.5 to 10 ppg. | 15.0 | 13 | 4 | 2–4 | 21.5 | 17 | 9 | 1–1 | 6.1 | 5.4 | 11.5 | 9.3 |

EXAMPLES 31 THROUGH 36

To illustrate the comparability of chrome lignosulfonate to the additive system of the instant invention, samples were prepared wherein chrome lignosulfonate and lignite were added to a base fluid formulated as in Examples 1 through 30.

After the hot-roll, each sample was retreated with one pound per barrel of chrome lignosulfonate (CLS) and lignite in physical admixture in a weight ratio of 2:1. Tests for Fann properties, fluid loss and pH were conducted in the same manner as in Examples 1–30a except that in Examples 31 through 34 the hot-rolling was conducted at 175° F. for 17 hours.

In Examples 35 and 36 the hot-roll was conducted at 250° C. for 17 hours as with the examples above, and a noticeable degradation of drilling mud properties was noted. Example 36 was formulated by contaminating a sample formulated as Example 35 with ten pounds per barrel cement, three pounds per barrel calcium chloride, two pounds per barrel sodium chloride and 30 percent by volume water. The contaminated sample was then retreated with one pound per barrel of additive containing chrome lignosulfonate and lignite in a 2:1 weight ratio. The sample was hot-rolled and measurements were retaken.

The contaminated and retreated samples showed an unsatisfactory increase in fluid loss as well as unsatisfactory rheological properties. Results are shown in Table 2.

TABLE 2

| Example | Additive Formulation in lbs/bbl and Mud Condition | Fann Prop. at 100° F. Before Hot Roll | | | | Fann Prop. at 100° F. After Hot Roll | | | | Fluid Loss Before Hot Roll | Fluid Loss After Hot Roll | pH Before Hot Roll | pH After Hot Roll |
|---|---|---|---|---|---|---|---|---|---|---|---|---|---|
| | | Va | Vp | YP | 10"–10' | Va | Vp | YP | 10"–10' | | | | |
| 31 | 8 lb/bbl CLS; 4 lb/bbl lignite Weighted to 10 ppg | 27 | 22 | 10 | 1–3 | 32 | 26 | 12 | 1–3 | 2.1 | 3.2 | 8.6 | 7.8 |
| 32 | Retreat Ex.31 with 1 lb/bbl of CLS and lignite at 2:1 weight ratio | 22 | 20 | 4 | 1–2 | 42 | 33 | 18 | 3–7 | 3.0 | 3.9 | 9.8 | 8.5 |

TABLE 2-continued

| Example | Additive Formulation in lbs/bbl and Mud Condition | Fann Prop. at 100° F. Before Hot Roll Va | Vp | YP | 10"–10' | After Hot Roll Va | Vp | YP | 10"–10' | Fluid Loss Before Hot Roll | After Hot Roll | pH Before Hot Roll | After Hot Roll |
|---|---|---|---|---|---|---|---|---|---|---|---|---|---|
| 33 | 4 lb/bbl CLS; 2 lb/bbl lignite | 23 | 19 | 8 | 1–1 | 35 | 27 | 16 | 2–4 | 2.6 | 4.2 | 9.0 | 8.5 |
| 34 | Retreat Ex.33 with 1 lb/bbl of CLS and lignite at 2:1 weight ratio | 21 | 19 | 4 | 1–2 | 35 | 28 | 14 | 3–4 | 3.8 | 4.3 | 9.6 | 8.8 |
| 35 | 8 lb/bbl CLS; 4 lb/bbl lignite weighted to 10 ppg. | 22 | 20 | 4 | 2–2 | 69 | 49 | 40 | 2–7 | 3.6 | 5.0 | 8.2 | 7.9 |
| 36 | Ex.35 contaminated and retreated |  |  |  |  | 65 | 47 | 36 | 2–7 | 7.4 | 20.0 |  | 10.9 |

EXAMPLES 37 THROUGH 48

These tests were conducted using a clay base emulsion mud taken from a drilling installation located in the THUMS project in Coastal California.

Samples of this mud were treated with additives as indicated. The additivies included the additive system of this invention (4:2:1:1), chrome lignosulfonate (CLS) and a fluid loss agent which is the sodium salt of polyacrylic acid (PA).

It should be noted that in Examples 47 and 48 wherein comparison is made between addition of eight pounds of the additive system of this invention and 8 pounds of chrome lignosulfonate (CLS) that the fluid formulations also included 10 percent by volume of additional water and 2 percent by volume of an oil phase containing colloidal asphalt. Examples 47 and 48 were hot-rolled at 325° for 72 hours rather than 250°. After the hot-roll the sample of example 47 was extremely thick and the emulsion broke. The sample represented by example 48 using the additive system of this invention continued to show a good emulsion with no settling although the mud had a heavy gel structure. Results are reported in Table 3 below.

TABLE 3

| Example | Additive Formulation in lbs/bbl and Mud Condition | Fann Prop. at 100° F. Before Hot Roll Va | Vp | YP | 10"–10' | After Hot Roll at 250° C for hrs. Va | Vp | YP | 10"–10' | Fluid Loss Before Hot Roll | After Hot Roll | pH Before Hot Roll | After Hot Roll |
|---|---|---|---|---|---|---|---|---|---|---|---|---|---|
| 37 | Clay Emulsion Mud from THUMS Project "As is" | 16 | 14 | 4 | 1–7 | 30 | 20 | 20 | 7–21 | 6.2 | 7.7 | 10.3 | 9.6 |
| 38 | Ex. 37 retreated with 5 lb/bbl oil phase additive and 10% vol. water | 17.5 | 14 | 7 | 2–12 | 26 | 18 | 16 | 5–19 | 7.8 | 7.6 | 9.7 | 9.1 |
| 39 | Ex.37 with 1 lb/bbl 4:2:1:1 | 15.5 | 13 | 5 | 1–2 | 21.5 | 18 | 7 | 2–4 | 4.6 | 6.4 | 10.7 | 9.9 |
| 40 | Ex.38 with 1 lb/bbl 4:2:1:1 and 1 lb/bbl PA | 26.5 | 22 | 9 | 2–5 | 31.5 | 25 | 13 | 2–3 | 3.0 | 2.4 | 10.3 | 9.4 |
| 41 | Ex.37 with 1 lb/bbl CLS | 16 | 14 | 4 | 1–5 | 26.5 | 20 | 13 | 3–15 | 5.9 | 7.2 | 10.3 | 9.6 |
| 42 | Ex.38 with 2 lb/bbl CLS and 1 lb/bbl PA | 26.5 | 21 | 11 | 2–7 | 48 | 33 | 30 | 4–20 | 3.6 | 3.2 | 10.6 | 9.4 |
| 43 | Ex.37 with 1 lb/bbl CLS and 3 lb/bbl lignite | 16.5 | 14 | 5 | 1–2 | 29 | 22 | 14 | 3–12 | 4.2 | 5.9 | 9.7 | 9.1 |
| 44 | Ex.38 with 9 lb/bbl CLS, 3 lb/bbl lignite and 1 lb/bbl PA | 25.5 | 22 | 7 | 2–3 | 51 | 35 | 32 | 5–23 | 2.2 | 3.6 | 9.3 | 8.6 |
| 45 | Ex.37 with 1 lb/bbl 4:2:1:1 and 3 lb/bbl lignite | 15 | 14 | 2 | 1–1 | 27 | 23 | 8 | 2–4 | 3.6 | 5.7 | 9.9 | 9.2 |
| 46 | Ex.38 with 9 lb/bbl 4:2:1:1, 3 lb/bbl lignite and 1 lb/bbl PA | 24 | 21 | 6 | 2–3 | 25 | 20 | 10 | 2–2 | 2.4 | 2.1 | 9.7 | 9.0 |

| Example | Additive | Fann Properties at 100°F Before Hot-Roll Va | Vp | YP | 10"–10' | After Hot-Roll at 325°F Va | Vp | YP | 10"–10' | Fluid Loss, API (R.T.-100 psi-30') Before Hot-Roll | After Hot-Roll at 325°F | pH Before Hot-Roll | After Hot-Roll |
|---|---|---|---|---|---|---|---|---|---|---|---|---|---|
| 47 | 8 lb/bbl CLS Retreat 1 lb/bbl CLS | 40 *40 | 30 *29 | 20 *22 | 3–18 *3–12 | Too thick to test — *32 | *25 | *14 | *2–8 | 2.2 cc *8.9 cc | Too thick to test *9.1 cc | 9.5 *9.0 | 8.8 *8.8 |
| 48 | 8 lb/bbl 4:2:1:1 Retreat with 1 lb/bbl 4:2;1:1 | 35 *39 | 27 *27 | 16 *24 | 3–3 *3–5 | Too thick to test — *25 | *20 | *10 | *2–2 | 2.2 cc *3.1 cc | Too thick to test *2.9 cc | 9.5 *9.3 | 9.0 *9.0 |

Observations After Hot-Roll at 325°F

47 Extremely thick; emulsion broke
48. Heavy gel; no settling; good emulsion

EXAMPLES 49 THROUGH 52

To demonstrate the amount of the additive system of this invention necessary to obtain adequate stabilization of a drilling mud a series of samples were run with increasing amounts of the additive system of this invention in a weight proportion of 4:2:1:1. The base mud employed was the same base mud as employed in examples 1 through 30 above.

Fann properties and fluid loss were measured before and after hot-rolling at 250° for 72 hours. The results of this testing indicate that about five pounds per barrel of the 4:2:1:1 additive system is sufficient to obtain satisfactory rheological properties and good emulsification.

Results of these tests are set forth in Table 4.

The results demonstrate that the alkali lignin alone in amounts equal to the overall amount of the additive system does not provide suitable stabilization to a drilling mud.

The base mud employed is the same as that used in Examples 1 through 30 above. And it was prepared in a similar manner. The hot-rolling of Examples 53 through 58 was carried out at 325° F. for 72 hours.

TABLE 4

Treating Ratio of Formula A-140 Using Base Sample "A"

| Example | Amount Additive 4:2:1:1 | Fann Properties a 100°F | | | | | | | | Fluid Loss, API (R.T.—100 psi—30') | | pH | |
|---|---|---|---|---|---|---|---|---|---|---|---|---|---|
| | | Before Hot-Roll | | | | After Hot-Roll at 250°F | | | | Before Hot-Roll | After Hot-Roll at 250°F | Before Hot-Roll | After Hot-Roll |
| | | Va | Vp | YP | 10''-10' | Va | Vp | YP | 10''-10' | | | | |
| 49 | 1 lb/bbl | 23 | 19 | 8 | 2-6 | 27.5 | 25 | 5 | 2-2 | 5.8 cc | 8.4 cc | 11.2 | 9.2 |
| 50 | 3 lb/bbl | 21.5 | 18 | 7 | 2-2 | 29.5 | 24 | 11 | 1-1 | 5.0 cc | 5.6 cc | 11.2 | 9.3 |
| 51 | 5 lb/bbl | 20 | 18 | 4 | 2-2 | 32 | 28 | 8 | 2-2 | 5.4 cc | 5.8 cc | 10.6 | 9.3 |
| 52 | 8 bl/bbl | 23 | 19 | 8 | 2-3 | 30 | 25 | 10 | 2-2 | 4.8 cc | 4.9 cc | 10.5 | 9.0 |

| Example | Observations After Hot-Roll at 250°F — 72 Hours |
|---|---|
| 49 | Light gel; not completely emulsified |
| 50 | Light gel; not completely emulsified |
| 51 | Light gel; no settling; good emulsion |
| 52 | Light gel; no settling; very good emuslion |

EXAMPLES 53 THROUGH 58

To demonstrate the balance provided by the additive system of this invention, the 4:2:1:1 additive system was tested in oil and water emulsion mud and in a clay-water-mud without an oil phase. Comparisons were made between the additive system and an amount equal to the weight of the additive system of the alkali lignin employed in the additive system of this invention alone without the remaining components of the additive system.

Results are set forth in Table 5.

Following each fluid loss measured in ccs., the thickness in inches of the filter cake formed is given in parenthesis.

TABLE 5

| Example | Additive Formulation and Mud Condition | Fann Prop. at 100° F. | | | | | | | | Fluid Loss | |
|---|---|---|---|---|---|---|---|---|---|---|---|
| | | Before Hot Roll | | | | After Hot Roll at 325°F for 72 hrs. | | | | Before Hot Roll | After Hot Roll |
| | | Va | Vp | YP | 10''-10' | Va | Vp | YP | 10''-10' | | |
| 53 | 4 lb/bbl alkali lignin (unweighted) oil-in-water emulsion | 13 | 11 | 4 | 1-6 | 43 | 31 | 24 | 2-3 | 6.8(1/32'') | 12.7(1/8'') |
| 54 | 2:1:.5:.5 (unweighted) oil-in-water emulsion | 13 | 11 | 4 | 1-5 | 22 | 19 | 6 | 1-1 | 6.4(1/32'') | 10.4(1/8'') |
| 55 | 8 lb/bbl alkali lignin (unweighted) oil-in-water emulsion | 16 | 12 | 8 | 2-6 | 48 | 32 | 5-12.0(1/32'') | | 9.6(1/8'') | |
| 56 | 4:2:1:1 (unweighted oil-in-water emulsion | 12.5 | 11 | 3 | 1-3 | 20 | 18 | 4 | 1-1 | 6.0(1/32'') | 6.6(1/8'') |
| 57 | 8 lb/bbl alkali lignin (unweighted) clay-water mud | 13 | 10 | 6 | 1-3 | 66 | 37 | 58 | 6-17 | 10.0(1/32'') | 15.5(1/4'') |
| 58 | 4:2:1:1 (unweighted) clay-water mud | 13 | 10 | 6 | 1-2 | 18 | 16 | 4 | 1-1 | 9.4(1/32'') | 8.6(1/8'') |

| Example | Observations after 72 hr. Hot Roll at 325° F |
|---|---|
| 53 | Solid mass; medium gel after 5 min. high speed agitation |
| 54 | Light to medium gel; good emulsion and no settling |
| 55 | Solid mass; medium gel after 5 min. high speed agitation |
| 56 | Light to medium gel; good emulsion; no Settling |
| 57 | solid mass; heavy gel after 5 min, high Speed agitation |
| 58 | Light to medium gel; no settling |

EXAMPLES 59 THROUGH 65

A number of different commercially available alkali lignins were substituted in additive systems according to the 4:2:1:1 ratio and tested in a base mud having the same composition as tested in Examples 1 through 30 above. These tests are set forth in Examples 50 through 65 and the following represents a description of each of the alkali lignins employed:

| Example 59 | A production sample of alkali lignin from Douglas fir bark. |
| --- | --- |
| Example 60 | A production sample of alkali lignin from Douglas fir bark. |
| Example 61 | A production sample of alkali lignin from Douglas fir bark. |
| Example 62 | Commercially available alkali lignin derived from Douglas fir bark. |
| Example 63 | Purified sodium salt of lignin derived from pine wood containing approximately 4% sodium. |
| Example 64 | A crude sodium salt of lignin derived from pine wood containing about 9.8% sodium, some of the sodium being combined with lignin as sodium lignate and some of the sodium being in the form of free sodium salt. |
| Example 65 | Alkali lignin material derived from Western hemlock bark. |

Each of the above lignins was formulated into an additive system in the ratio of 4:2:1:1 with lignite, quebracho, and sodium chromate. The additive system was added to the base formulation set forth in Examples 1 through 30a in the amount of eight pounds per barrel. Each sample was tested for Fann properties and for fluid loss both before and after hot rolling at 325° for 72 hours.

Results are reported in Table 6 below.

The base mud for Example 66 was once again the same as that used in Examples 1 through 30 above. The base mud for Examples 67–72 was a water base mud for testing additives. The base mud contained 15 pounds of Bengel (bentonite), 10 pounds of X-Act Clay and 10 pounds of Baroco clay dispersed in a barrel of fresh water. The additive system of examples 1–30 (4:2:1:1) was employed save that various other chromate salts were substituted for sodium chromate. The pH of each sample was adjusted to between 11–12 with sodium hydroxide. Examples 71 and 72 required slightly more sodium hydroxide to achieve the desired pH.

Results showed that sodium chromate and sodium dichromate function equally well. The ammonium dichromate gave similar result. The potassium chromate and dichromate and a tendency to produce high gel structures initially. However, after hot roll, the potassium chromate appeared to function well. It would appear that the potassium chromate is satisfactory once it is permitted to equilibrate in the mud. Fann properties and fluid loss were measured both before and after hot-rolling. The hot-rolling procedure was run at 250° F for 17 hours in Example 66. In Examples 67–72 hot-rolling was conducted at 300° F for 90 hours. Test results include measurement of filter cake thickness

TABLE 6

| | | Fann Properties at 100°F | | | | | | | Fluid Loss, API (R.T.-100 psi-30') | | | | pH | |
| --- | --- | --- | --- | --- | --- | --- | --- | --- | --- | --- | --- | --- | --- | --- |
| | | Before Hot-Roll | | | | After Hot-Roll | | | Before Hot-Roll | | After Hot-Roll | | | |
| Example | Alkali Lignin Identification | Va, cps | Vp, cps | YP, pcsf | Gels 10"10' pcsf | Va, cps | Vp, cps | YP, pcsf | Gels 10"10' pcsf | cc | F/Ck. | cc | F/Ck. | Before Hot-Roll | After Hot-Roll |
| 59 | A | 17 | 14 | 6 | 2–3 | 29 | 24 | 10 | 2–2 | 4.9 | 1/32" | 5.0 | 1/32" | 10.7 | 9.0 |
| 60 | B | 18.5 | 15 | 7 | 2–2 | 33 | 27 | 12 | 2–2 | 4.1 | 1/64" | 4.4 | 1/64" | 10.7 | 9.4 |
| 61 | C | 17 | 13 | 8 | 2–3 | 37.5 | 28 | 19 | 2–3 | 5.0 | 1/32" | 4.8 | 1/32" | 10.5 | 9.1 |
| 62 | D | 18 | 14 | 8 | 2–3 | 33 | 27 | 12 | 2–3 | 4.5 | 1/32" | 5.7 | 1/32" | 9.5 | 9.0 |
| 63 | E | 21 | 16 | 10 | 2–3 | 36 | 27 | 18 | 2–3 | 4.3 | 1/32" | 4.6 | 1/32" | 10.3 | 9.3 |
| 64 | F | 21 | 18 | 6 | 2–3 | 34 | 28 | 12 | 2–3 | 4.4 | 1/32" | 4.1 | 1/32" | 10.6 | 9.5 |
| 65 | H | 16 | 12 | 8 | 2–2 | 42 | 36 | 12 | 2–2 | 4.6 | 1/64" | 4.8 | 1/64" | 10.4 | 9.6 |

| Example | Observations After Hot-Roll | Example | |
| --- | --- | --- | --- |
| 59 | Light to medium gel no settling; good emulsion | 64 | Medium gel; no settling; good emulsion |
| 60 | Medium gel; no settling; good emulsion | 65 | medium gel; good emulsions no settling |
| 61 | Light to medium gel; no settling; good emulsion | | |
| 62 | Medium gel; no settling; good emulsion | | |
| 63 | Medium gel; no settling; good emulsion | | |

EXAMPLES 67 THROUGH 72

Similar tests to those conducted in Examples 59 through 65 were made substituting sodium humate for lignite (Example 66) and substituting various other chromate salts for sodium chromate (Examples 67–72).

(F/Ck.) following the fluid loss tests.

The tests indicate that although sodium chromate appears to perform most dependably other chromate salts will be acceptable depending upon the conditions under which it is anticipated they will be used. Sodium humate also appears to be a satisfactory substitute for lignite.

Results of these tests are reported in Table 7.

TABLE 7

| | | Fann Properties at 100°F | | | | | | | |
| --- | --- | --- | --- | --- | --- | --- | --- | --- | --- |
| | | Before Hot-Roll | | | | After Hot-Roll | | | |
| Example | | Va, cps | Vp, cps | YP, No./100 ft² | Gels 10"10' No./100 ft² | Va, cps | Vp, cps | YP, No./100 ft² | Gels 10"10' No./100 ft² |
| 66 | Sodium Humate | 16 | 13 | 6 | 2–2 | 20 | 17 | 6 | 1–1 |
| 67 | Sodium Chromate | 18 | 14 | 8 | 2–5 | 49 | 44 | 10 | 2–4 |

TABLE 7-continued

| | | Fann Properties at 100°F | | | | | | | |
|---|---|---|---|---|---|---|---|---|---|
| | | Before Hot-Roll | | | | After Hot-Roll | | | |
| Example | | Va, cps | Vp, cps | YP, No./100 ft² | Gels 10"10' No./100 ft² | Va, cps | Vp, cps | YP, No./100 ft² | Gels 10"10' No./100 ft² |
| 68 | Sodium Dichromate | 18 | 16 | 4 | 1-7 | 37 | 31 | 12 | 2-4 |
| 69 | Potassium Chromate | 14 | 10 | 8 | 3-36 | 30 | 26 | 8 | 1-2 |
| 70 | Potassium Dichromate | 16 | 14 | 4 | 1-16 | 28 | 25 | 6 | 1-2 |
| 71 | Ammonium Dichromate | 15 | 13 | 4 | 1-6 | 25 | 22 | 6 | 1-2 |
| 72 | Chromium Trioxide | 18 | 16 | 4 | 1-12 | 25 | 22 | 6 | 1-2 |

| | | Fluid Loss, API (R.T.-100 pis-30') | | | | | pH |
|---|---|---|---|---|---|---|---|
| | | Before Hot - Roll | | After Hot - Roll | | | After |
| Example | | cc | F/Ck. | cc | F/Ck. | In | Hot Roll |
| 66 | Sodium Humate | 5.2 | 1/64" | 4.6 | 1/64" | 11.0 | 9.3 |
| 67 | Sodium Chromate | — | — | 8.4 | 2/32" | 11.6 | 9.4 |
| 68 | Sodium Dichromate | — | — | 7.8 | 2/32" | 11.6 | 9.4 |
| 69 | Potassium Chromate | — | — | 7.8 | 2/32" | 11.5 | 9.6 |
| 70 | Potassium Dichromate | — | — | 8.2 | 2/32" | 11.3 | 9.6 |
| 71 | Ammonium Dichromate | — | — | 7.9 | 2/32" | 11.2 | 9.8 |
| 72 | Chromium Trioxide | — | — | 8.2 | 2/32' | 11.2 | 9.5 |

| Example | Observations After Hot-Roll |
|---|---|
| 66 | Medium gel; good emulsion; no settling |
| 67-72 | All showed light gel with no settling |

EXAMPLES 73 THROUGH 76

To illustrate the performance of the additive system of this invention in salt water type muds as well as fresh water muds several simulated salt water muds were formulated.

A sea water mud was formulated from one barrel of simulated sea water, 15 pounds of bentonite, fifteen pounds of Baroco clay, ten pounds of drill solids, ten pounds of the additive system of this invention in a 4:2:1:1 weight ratio, two pounds of sodium salt of polyacrylic acid and one pound of sodium hydroxide. There was then added 10 percent by volume of an oil phase containing colloidal asphalt. The formulation was mixed for 10 minutes in a Waring blender at low speed and subjected to tests as above. Results are set forth as Example 73 below.

The saturated brine muds were formulated from one barrel of saturated brine, 15 pounds of Attagel 150, ten pounds bentonite, ten pounds drill solids, fifteen pounds of the additive system of this invention in 4:2:1:1 weight ratio, four pounds of sodium salt of polyacrylic acid, 2.5 pounds of sodium hydroxide and 10 percent by volume of an oil phase containing colloidal asphalt. The mixture was agitated in a Waring blender for 10 minutes at low speed.

This saturated brine mud was tested unweighted (Example 74) and weighted to fifteen pounds per gallon with barium sulfate (Example 75). A similarly formulated saturated brine mud wherein the additive system of this invention was not used but rather fifteen pounds of chrome lignosulfonate was also tested (Example 76) and was found to be unsatisfactory.

Results are set forth in Table 8.

TABLE 8

| | | | | Fann Properties at 100°F | | | | | | | |
|---|---|---|---|---|---|---|---|---|---|---|---|
| | | Hot-Rolled | | Before Hot-Roll | | | | After Hot-Roll | | | |
| Ex. | | Time, Hours | Temp, °F | Va, cps | Vp, cps | YP, No./100ft² | Gels, 10"-10' No./100ft² | Va, cps | Vp, cps | YP No./100ft² | Gels, 10"-10' No./100ft² |
| 73 | Sea water mud (unweighted) with 10 lb/bbl of additive | 17 | 325 | 13 | 11 | 4 | .5-2 | 9.5 | 9 | 1 | .5-.5 |
| 74 | Sat. brine mud (unweighted) with 15 lb/bbl of additive | 17 | 325 | 22 | 17 | 10 | 2-10 | 17.5 | 16 | 3 | 1-2 |
| 75 | Sat. brine mud (weighted to 15 ppg.) with 15 lb/bbl additive | 17 | 325 | 32 | 30 | 4 | 1-2 | 26 | 24 | 4 | 1-3 |
| 76 | Sat. brine (weighted to | 17 | 325 | 38 | 33 | 10 | 2-7 | 42 | 24 | 36 | 28-83 |

TABLE 8-continued

| Ex. | Hot-Rolled Time, Hours | Hot-Rolled Temp, °F | Before Hot-Roll Va, cps | Before Hot-Roll Vp, cps | Before Hot-Roll YP, No./100ft² | Before Hot-Roll Gels, 10''-10' No./100ft² | After Hot-Roll Va, cps | After Hot-Roll Vp, cps | After Hot-Roll YP No./100ft² | After Hot-Roll Gels, 10''-10' No./100ft² |
|---|---|---|---|---|---|---|---|---|---|---|
| 15 ppg.) with 15 lb/bbl CLS | | | | | | | | | | |

| Example | Fluid Loss, API (R.T.-100 psi-30') Before Hot-Roll cc | Fluid Loss, API (R.T.-100 psi-30') Before Hot-Roll F/Ck. | Fluid Loss, API (R.T.-100 psi-30') After Hot-Roll cc | Fluid Loss, API (R.T.-100 psi-30') After Hot-Roll F/Ck. | pH Initial | pH After Hot-Roll | Observations After Hot-Roll |
|---|---|---|---|---|---|---|---|
| 73 | 5.7 | 1/64' | 6.4 | 1/64'' | 10.4 | 8.5 | Light gel; good emulsion no settling |
| 74 | 3.9 | 1/64'' | 10.0 | 1/64'' | 10.3 | 8.4 | Light gel; good emulsion no settling |
| 75 | 9.2 | 1/32'' | 4.3 | 1/32'' | 9.3 | 8.3 | Medium gel; good emulsion no settling |
| 76 | 19.4 | 1/2'' | 6.3 | 1/32'' | 9.3 | 8.2 | Emulsion broke; 1/2'' oil TS; no BS; grainy |

EXAMPLES 77 THROUGH 81

A series of sea water-mud formulations were made from one barrel of simulated sea water, fifteen pounds of bentonite, fifteen pounds of baroco clay, ten pounds of drill solids, and sufficient barium sulfate to weight the material to 18 pounds per gallon. The formulation was then modified by the addition of 2.5 pounds per barrel of caustic and 10 percent by volume of an oil phase containing colloidal asphalt.

Fann properties and fluid loss was measured before and after a hot-roll for 72 hours at 325° F. After the hot-roll Example 77 and Example 82 were the only ones fluid enough to be tested. Excessive gas buildup in the hot-roll cells containing the samples of Examples 78 through 80 caused the cell lids to blow off. The muds of Examples 77 and 81 did not undergo thermal degradation as did the lignosulfonate additives of Examples 78 through 80.

Results are set forth in Table 9.

TABLE 9

| Ex. | 18 ppg Sea Water Mud With: | Fann Properties at 100°F Before Hot-Roll Va, cps | Vp, cps | YP, pcsf | Gels 10''-10', pcsf | After Hot-Roll Va, cps | Vp, cps | YP pcsf | Gels 10''-10', pcsf | Fluid Loss, API (R.T.-100 psi-30') Before Hot-Roll cc | F/Ck. | After Hot-Roll cc | F/Ck. |
|---|---|---|---|---|---|---|---|---|---|---|---|---|---|
| 77 | 10 lb. of 4:2:1:1 5 lb. Lignite | 87 | 60 | 54 | 17–33 | 76 | 58 | 36 | 8–33 | 1.8 | 1/32'' | 1.9 | 1/32'' |
| 78 | 10 lb. Add. A 5 lb. Chrome Lignite | 82 | 58 | 48 | 15–33 | *** | *** | *** | *** | 1.6 | 1/32'' | *** | *** |
| 79 | 10 lb. Add. B 5 lb. Lignite | 60 | 47 | 26 | 8–19 | *** | *** | *** | *** | 1.3 | 1/32'' | *** | *** |
| 80 | 10 lb. Add. C 5 lb. Lignite | 63 | 45 | 36 | 15–28 | *** | *** | *** | *** | 1.3 | 1/32'' | *** | *** |
| 81 | 10 lb. of 4:2:1:1 (Indulin C) 5 lb. Lignite | 67 | 47 | 40 | 12–28 | 84 | 64 | 40 | 11–26 | 1.7 | 1/32'' | 2.4 | 1/32'' |

| Example | HT-HP Fluid Loss (300°F-500 psi-30') Before Hot-Roll cc | HT-HP Fluid Loss (300°F-500 psi-30') After Hot-Roll cc | pH Before Hot-Roll | pH After Hot-Roll | Observations After Hot-Roll |
|---|---|---|---|---|---|
| 77 | 22.0 | 10.0 | 10.5 | 8.9 | Solid mass, medium gel after 5' blending at high speed |
| 78 | 38.6 | *** | 10.0 | 7.7 | Solid mass with 1/8'' oil breakout; too thick to test after 5' blending at high speed |
| 79 | 48.8 | *** | 10.0 | 7.6 | Solid mass with 1/8'' oil breakout; too thick to test after 5' blend at high speed |
| 80 | 46.8 | *** | 10.0 | 8.0 | Solid mass with 1/4'' oil breakout; too thick to test after 5' blend at high speed |
| 81 | 24.6 | 10.6 | 10.7 | 9.0 | Heavy gel; no settling; good emulsion |

Two identical such formulations then were treated with additive systems as set forth below in Table 9. Each of the additive systems designated as Additive A, Additive B, and Additive C in Examples 79 through 81 are commercially available lignosulfate additives for use in water base drilling fluids.

EXAMPLES 82 THROUGH 87

To illustrate the superior noncorrosive properties of the additive system of this invention a series of mud samples were prepared utilizing commercially available lignosulfonate water base mud additives tested in Table 9 in comparison with the additive system of this invention.

The base mud was formulated from one barrel of fresh water, ten pounds bentonite, ten pounds X-Act clay, twenty pounds Illite and sufficient barium sulfate to weight the mud to eighteen pounds per gallon. To this base sample were then added Additives A, B, and C, referred to above, which are commercially available lignosulfonate additives for water based mud. Each mud was subjected to a surface corrosion test, an iron sulfide test (arsenite method), and a stress corrosion cracking test.

The corrosion test involved maintaining each of the mud samples in contact with a 1020 mild steel coupon having a specific gravity of about 7.7 and an area of six square inches in an aging cell at 350° F. for 14 days under a pressure of 400 pounds per square inch of nitrogen. Corrosion rate in mils per year was computed as follows:

$$\text{corr. rate} = \frac{\text{weight of metal removed (gms.)} \times 1000}{\text{Sp.Gr. of Metal} \times 16.387 \times \text{Area} \times \text{Yrs. Duration} \atop (\text{gm/cc}) \quad (\text{cc/in}^3) \quad (\text{in}^2) \quad (\text{Days}/365)}$$

The iron sulfide test is to determine the presence of iron sulfide on the coupon as an indication of hydrogen sulfide in the mud environment in which the coupon has been maintained. Each tested coupon is removed from the aging cell, cleaned, and is contacted with a standard solution of 15 percent hydrochloric acid containing sodium arsenite and a small amount of liquid detergent. The presence of iron sulfide is indicated by the formation of a yellowish precipitate.

The stress corrosion cracking test involved maintaining prestressed roller bearings in contact with the mud during the aging process. A cracking of the roller bearing was considered to be failure of this test.

The additive system of this invention was formulated using different alkali lignins identified in Examples 59 through 65 above. All performed satisfactorily.

The results are set forth in Table 10 below.

TABLE 10

| Example | Additive | Coupon Condition After Surface Corrosive Test | Weight Loss of Coupon (gm) | Corrosion Rate mils/year | Iron Sulfide Test | Stress Crack Test |
|---|---|---|---|---|---|---|
| 82 | 8 lbs. Additive B (Ferrochrome ligno-sulfonate) + 4 lbs. lignite | Spotted black discolorations and localized pitting | .0662 | 2.3 | Positive | Fail |
| 83 | 8 lbs. Additive A + 4 lbs. chrome lignite | Spotted black discolorations and slightly etched on both sides | .0290 | 1.0 | Positive | Fail |
| 84 | 8 lbs. Additive C +4 lbs. lignite | Spotted black discoloration and slightly etched on both sides | .0227 | 0.8 | Negative | Fail |
| 85 | 12 lbs. of 4:2:1:1 (using Alkali (Lignin D) | No discoloration and slight etching of one side | .0186 | 0.6 | Negative | Pass |
| 86 | 12 lbs. of 4:2:1:1 (using Alkali Lignin B) | No discoloration or etching | .0169 | 0.6 | Negative | Pass |
| 87 | 12 lbs. of 4:2:1:1 (using Alkali Lignin F) | No discoloration or etching | .0149 | 0.5 | Negative | Pass |

EXAMPLES 88 THROUGH 93

Because of the known oxidizing properties of the chromate ion, a number of other oxidizing agents were tested in the additive system of this invention. The mud employed was the same mud as used above in Examples 67–72. A 4:2:1:1 additive system was used substituting various oxidizing agents.

It was found that only the chromate salts functioned to maintain to 10′ and 10″ gels of the muds within the desired limits. Although potassium permanganate functioned well initially, imparting low gels, after hot roll, the permanganate sample was unsatisfactory.

Results are shown below in Table 11.

TABLE II

| | | Fann Properties a 100° F | | | | | | | | |
|---|---|---|---|---|---|---|---|---|---|---|
| | | Before Hot Roll | | | Gels | | After Hot Roll | | | Gels | |
| Example | Oxidizing Compound | Va, cps | Vp, cps | YP pcsf | 10″–10′, pcsf | pH | Va, cps | Vp, cps | YP pcsf | 10″–10′, pcsf | pH |
| 88 | Potassium Chromate | 11 | 10 | 2 | 1–6 | 10.8 | 28 | 25 | 6 | 1–3 | 9.4 |
| 89 | Potassium Dichromate | 18 | 16 | 4 | 1–4 | 11.0 | 25 | 22 | 6 | 1–2 | 9.5 |
| 90 | Chromium Trioxide | 16 | 15 | 2 | 1–2 | 10.8 | 26 | 20 | 6 | 1–2 | 9.5 |
| 91 | Potassium Permanganate | 15 | 13 | 4 | 1–3 | 11.5 | 30 | 26 | 8 | 2–15 | 9.1 |
| 92 | Calcium Hypochlorite | 25 | 20 | 10 | 4–35 | 11.8 | 67 | 44 | 46 | 23/96 | 9.7 |
| 93 | Potassium Persulfate | 18 | 13 | 10 | 10–56 | 11.2 | 93 | 50 | 86 | 25/107 | 8.9 |

EXAMPLES 94 THROUGH 96

Three samples of a water base mud were prepared utilizing a water base drilling fluid composition similar to that employed in Examples 67–72. Additives were provided in the appropriate proportion to create simulated barrels of drilling mud having additives in the pounds per barrel proportions as set forth below. The alkali metal lignin utilized in Example 94 is a commercial alkali metal lignin derived from pine wood as used in Example 64 above. The proportions of additives added to the various samples are as follows:

|  | Example 94 | Example 95 | Example 96 |
|---|---|---|---|
| Alkali Metal Lignin, ppb | 4 | 0 | 0 |
| Lignite, ppb | 2 | 2 | 4 |
| Quebracho, ppb | 1 | 1 | 2 |
| Sodium Chromate, ppb | 1 | 1 | 2 |

To each sample was added 1.5 cc. of a 50 percent by weight sodium hydroxide solution, and each mixture was blended thoroughly in a Hamilton-Beach blender for 10 minutes.

The three samples so prepared were tested to determine rheological properties, specifically to determine apparent viscosity ($V_a$), plastic vixcosity (PV), and yield point (YP). From the results below, it may be seen that the three samples had basically similar initial rheological properties except that the yield point of Example 96 was somewhat lower than the yield point obtained by testing Examples 94 and 95.

|  | Example 94 | Example 95 | Example 96 |
|---|---|---|---|
| $V_a$ | 18 | 19 | 16 |
| PV | 14 | 14 | 14 |
| YP | 8 | 10 | 4 |

Each of the samples was then aged for ninety hours at a temperature of 300° F. in a rotating bomb container. Following this aging process, Example 94 remained as a light gel with substantially no settling. However, Examples 95 and 96 were substantially solid masses and required five minutes agitation on a Hamilton-Beach blender at low speed in order to obtain a medium gel which then could be tested for rheological properties. After this agitation, the rheological properties of the three samples was determined and the results were as follows:

|  | Example 94 | Example 95 | Example 96 |
|---|---|---|---|
| $V_a$ | 49 | 47 | 44 |
| PV | 44 | 36 | 36 |
| YP | 10 | 22 | 16 |

After agitation of Examples 95 and 96, they assumed an apparent viscosity and a plastic viscosity approximately equal to that of sample 1. However, the yield point of Examples 95 and 96 was substantially higher than that of Examples 94. Yield point of a drilling fluid is an indication of, for example, the energy or pump pressure necessary to change the mud from a gel to a pumpable fluid. The yield point of Examples 95 and 96 was undesirably high for a clay-water mud having a density of about 8.8 pounds per gallon, which was the mud density of the three samples.

Following the aging process, the drilling fluid samples were contaminated to simulate contamination often encountered by drilling fluid under actual drilling conditions. The amount of contaminant was proportioned so as to simulate a contamination of two pounds per barrel of rock salt and ten pounds per barrel of green cement. In addition, a saturated solution of calcium chloride was added to each sample in an amount corresponding to one percent (1 percent) by volume of the sample. The contaminants were thoroughly blended into each sample. It was then found that Examples 95 and 96 formed substantially solid masses too thick to stir while only Example 94 remained fluid. Example 94 poured readily from its container. Examples 95 and 96 had to be removed from the container with a spatula and substantially none of the fluid in either Examples 95 or 96 would pass through an open mesh grate.

What is claimed is:

1. A non-lignosulfonate-containing thinning and gel forming additive system for use in an alkaline water base drilling fluid which consists essentially of, in combination:
    a. about 40 to about 60 percent by weight of a water-soluble alkali metal lignin;
    b. about 20 to about 47 percent by weight of lignite;
    c. about 3 to about 15 percent by weight quebracho; and
    d. about 3 to about 15 percent by weight of a water-soluble chromate salt capable of releasing chromate ions in the alkaline water base drilling fluid system, said percentage of chromate salt measured as an equivalent quantity of sodium chromate.

2. The additive system of claim 1 wherein said chromate salt is a water-soluble alkali metal chromate.

3. The additive system of claim 2 wherein said chromate salt is sodium chromate.

4. The additive system of claim 1 wherein said alkali metal lignin is a sodium or potassium lignin product derived from an alkaline wood pulping process.

5. An alkaline water base drilling fluid containing water, a hydratable clay, a weighting agent, and a non-lignosulfonate-containing thinning and gel forming additive system consisting essentially of from about 40 to about 60 percent by weight of an alkali metal lignin, from about 20 to about 47 percent by weight lignite, from about 3 to about 15 percent by weight quebracho, and from about 3 to about 15 percent by weight of a water-soluble chromate salt capable of releasing chromate ions in the alkaline water base drilling fluid, said percentage of chromate salt being measured as an equivalent quantity of sodium chromate.

6. The fluid of claim 5 wherein said additive system is present in an amount from about 5 to about 25 pounds per barrel.

7. The drilling fluid of claim 5 wherein said drilling fluid is a salt water drilling fluid.

8. The drilling fluid of claim 7 wherein the water of said fluid is saturated brine.

9. The drilling fluid of claim 7 wherein said water in said fluid is sea water.

10. The drilling fluid of claim 5 wherein said water forms a continuous phase of an oil-in-water emulsion.

11. The drilling fluid of claim 10 wherein said oil-in-water emulsion additionally contains colloidal asphalt.

12. A method of restoring rheological properties and gel forming properties to an alkaline water based drilling fluid under conditions of use without introducing corrosive materials into said fluid which comprises adding to said fluid circulating into a well borehole a small amount of an additive system consisting essentially of:
    a. about 40 to about 60 percent by weight of a water soluble alkali metal lignin;
    b. about 20 to about 47 percent by weight of lignite;
    c. about 3 to about 15 percent by weight quebracho; and d. about 3 to about 15 percent by weight of a water-soluble chromate salt capable of releasing chromate ions in the alkaline water base drilling fluid system, said percentage of chromate salt being measured as an equivalent quantity of sodium chromate.

* * * * *

UNITED STATES PATENT OFFICE
CERTIFICATE OF CORRECTION

Patent No. 3,956,142  Dated May 11, 1976

Inventor(s) Doyne L. Wilson, et al.

It is certified that error appears in the above-identified patent and that said Letters Patent are hereby corrected as shown below:

In the title on the cover sheet, after "MAKING", insert --SAME--.

Column 1, second line of the title, after "MAKING", insert --SAME--.

Column 4, line 52, after "normally is", insert --in--.

Column 6, line 2, change "watere" to --water--.

Column 9, line 37, after "strength", insert --(10"-10')--.

In Table 1 (bottom of Columns 9 and 10), the additive ratio given in Example 2 should read "4:2:1.5:.5".

In Table 1 (top of Columns 11 and 12), the additive ratio in Example 17 should read "4:2:.5:1.5";

in Example 26, the additive ratio should read "4:2:1.5:1.5";

in Example 29, the second line of the additive formulation, after "Ex.", insert --11--;

in Example 30b, the entire line is displaced and the columns should be spaced respectively as follows:

"30b   3.75:3.75:.25:.25         14.5    12    5    2-3
       to 10 ppg 21.0    18    6    1-2    6.3    5.8    11.0    9.2".

UNITED STATES PATENT OFFICE
CERTIFICATE OF CORRECTION

Patent No. 3,956,142   Dated May 11, 1976

Inventor(s) Doyne L. Wilson, et al.

It is certified that error appears in the above-identified patent and that said Letters Patent are hereby corrected as shown below:

In Table 3 (middle of Columns 13 and 14), following Example 45, Example 46 is obliterated and unclear as to the first two columns and should read as follows:

"46    Ex. 38 with 9 lb/bbl 4:2:1:1, 3 lb/bbl lignite and 1 lb/bbl PA".

At the bottom of Table 3, Example 48 is misaligned in printing and should read:

"48    Heavy gel; no settling; good emulsion".

In Table 5 (middle of Columns 15 and 16), the numbered sequence of Example 55 is partially obliterated and misaligned and the sequence of numbers should respectively read as follows:

"16    12    8    2-6    48    32    32    5-12

7.0(1/32")    9.6(1/8")"

In Column 24, under "Examples 88 through 93", eighth line, change "to maintain to" to read --to maintain the--.

Other minor typographical errors have been noted but are not mentioned as clarity of the contents exists notwithstanding.

Signed and Sealed this

Tenth Day of August 1976

[SEAL]

Attest:

RUTH C. MASON
*Attesting Officer*

C. MARSHALL DANN
*Commissioner of Patents and Trademarks*